US009374653B2

(12) United States Patent
Nguyen

(10) Patent No.: US 9,374,653 B2
(45) Date of Patent: Jun. 21, 2016

(54) METHOD FOR A MULTI-CHANNEL WIRELESS SPEAKER SYSTEM

(71) Applicant: Henry Hung Nguyen, Richardson, TX (US)

(72) Inventor: Henry Hung Nguyen, Richardson, TX (US)

( * ) Notice: Subject to any disclaimer, the term of this patent is extended or adjusted under 35 U.S.C. 154(b) by 0 days.

(21) Appl. No.: 14/714,056

(22) Filed: May 15, 2015

(65) Prior Publication Data

US 2015/0334478 A1 Nov. 19, 2015

Related U.S. Application Data

(60) Provisional application No. 61/993,428, filed on May 15, 2014.

(51) Int. Cl.
*H04B 3/00* (2006.01)
*H04S 7/00* (2006.01)
*H04R 1/00* (2006.01)

(52) U.S. Cl.
CPC *H04S 7/308* (2013.01); *H04R 1/00* (2013.01); *H04R 2420/05* (2013.01); *H04R 2420/07* (2013.01)

(58) Field of Classification Search
None
See application file for complete search history.

(56) References Cited

U.S. PATENT DOCUMENTS

2004/0223622 A1* 11/2004 Lindemann .............. H04R 5/04 381/79
2008/0318518 A1* 12/2008 Coutinho .............. H04H 20/62 455/3.06
2014/0029701 A1* 1/2014 Newham ................ H04L 7/041 375/340

* cited by examiner

*Primary Examiner* — Muhammad N Edun

(57) ABSTRACT

A method for a multi-channel wireless speaker system utilizes a wireless private network to ensure proper synchronization of a plurality of speaker units. The system includes the plurality of speaker units and an audio receiver. Each speaker unit includes a wireless communication device and a digital-to-analog converter module. The audio receiver includes an audio interface and a wireless access point. The method includes probing each speaker units in order to identify the speaker channel and use said information to compile a sound system configuration. The sound system configuration is used to configure a plurality of compatible audio channels from an audio frame, wherein each channel corresponds an audio sample. The audio frame is broadcasted to the plurality of speaker units. Each speaker unit extracts the audio sample corresponding to a specific channel that is in turn associated with the speaker type. The audio sample is sounded by each speaker unit.

7 Claims, 6 Drawing Sheets

METHOD FOR A MULTI-CHANNEL WIRELESS SPEAKER SYSTEM

The current application claims a priority to the U.S. Provisional Patent application Ser. No. 61/993,428 filed on May 15, 2014.

FIELD OF THE INVENTION

The present invention relates generally to wireless speaker systems. More specifically, the present invention is a method for implementing a multiple channel wireless speaker system through a private access point.

BACKGROUND OF THE INVENTION

The advancement of audio technology has led to the increasing replacement of traditional wired audio speakers with wireless audio speakers. Audio data is transmitted to and received by wireless audio speakers via radio frequency (RF) waves rather than audio cables. As such, wireless audio speakers offer a number of advantages over their wired counterparts, the most obvious being the lack of wires connecting the speakers to the sound system. The lack of visible cables present in an audio speaker system allows for a much more aesthetically pleasing audio system setup and eliminates tripping hazards for the user and anyone walking around the area. Because a conventional wireless speaker set is connected utilizing a public or shared router, proper synchronization amongst the set speakers is often an issue. Wireless data communication through a public or shared router is often inconsistent and can result in audio signals being delayed and arriving at individual speakers at offset times. Additionally, failure of a transmitter or receiver may result in a dropped signal and reduced quality of a listening experience. The present invention seeks to address the aforementioned issues as well as enhance and improve upon conventional wireless audio speaker systems.

The present invention is a wireless multichannel speaker system that utilizes a wireless 802.11 private access point. Through the use of a private access point, the audio system becomes a wireless private network fully dedicated to the system. A dedicated wireless network allows for the audio system to use alternative network protocols for data transmission that are not efficient on public or shared networks. A dedicated wireless network ensures the speakers of the system are in sync and that there are no delays of any kind.

DETAIL DESCRIPTIONS OF THE INVENTION

All illustrations of the drawings are for the purpose of describing selected versions of the present invention and are not intended to limit the scope of the present invention.

The present invention relates to wireless speaker systems. More specifically, the present invention is a method and system for playing audio from an audio source by a multitude of speakers through a wireless private network. This is accomplished by wirelessly connecting each of the speakers to a private access point. Data transmission through a wireless private network ensures high quality sound as the speakers receive the audio data simultaneously with no delay. To further prevent any out of sync in playback between the speakers, the present invention synchronizes the internal clocks of the speakers.

Figure 1:
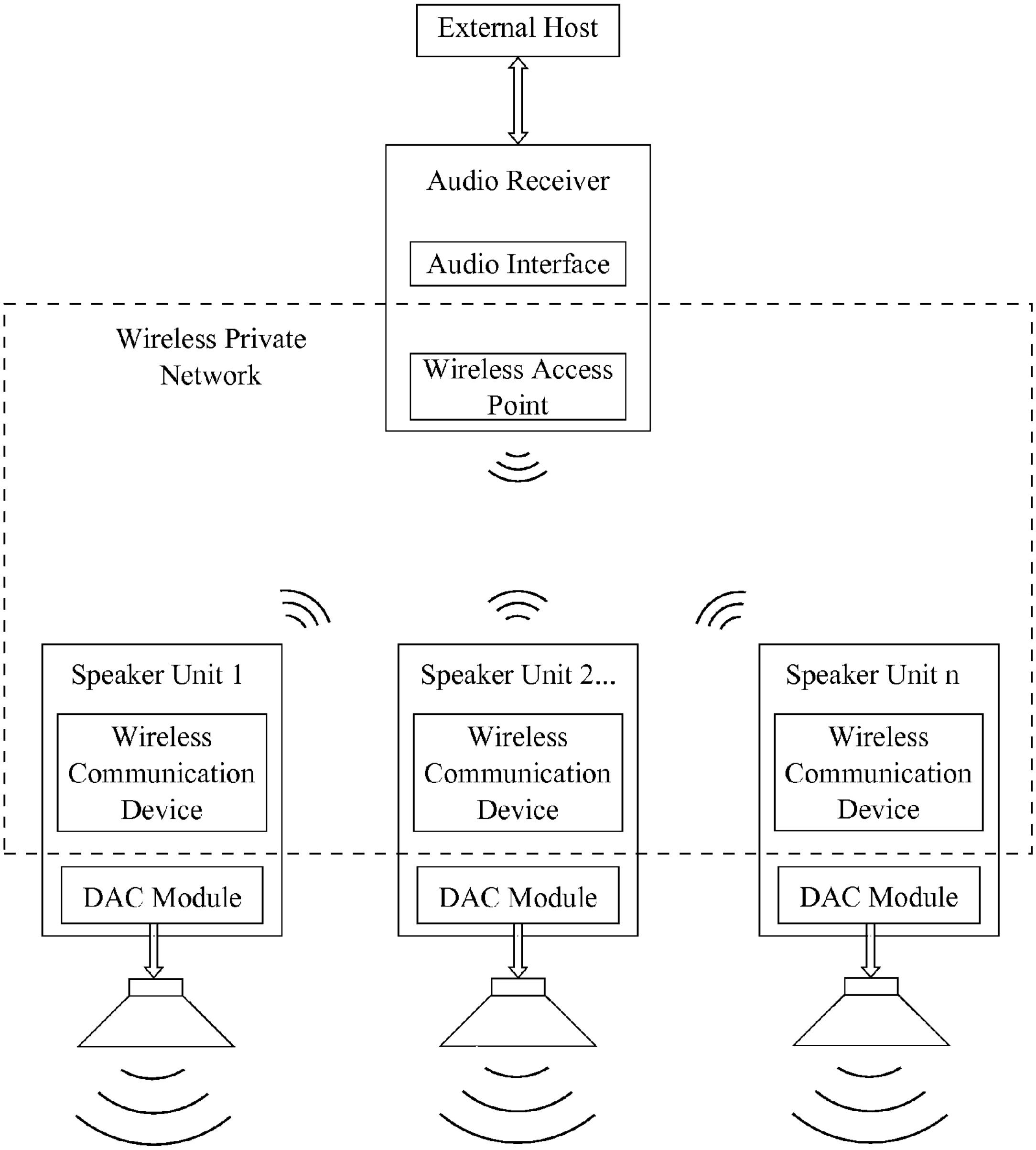
FIG. 1 is a system view of the present invention.

Referring to FIG. 1, the system is the physical hardware required to execute the method of the present invention. The hardware includes is a plurality of speaker units and an audio receiver. The speaker unit is an electroacoustic transducer; a device designed to convert electrical signals into a corresponding sound. Each of the plurality of speaker units includes a wireless communication device and at least one sound modulator with an internal clock. The wireless communication device allows for wireless bi-directional communications with the audio receiver. The sound modulator is a device which varies properties of a signals. One type of sound modulator is a digital-to-analog converter (DAC) which converts digital data, such as binary, into a corresponding analog signal. This signal is then used to drive the speakers to produce sound. Various types of DAC modules may be used for each of the plurality of wireless speakers. The internal clock is used by the DAC to process the digital signal into the analog signal. The audio receiver accepts audio frames from an external host and wirelessly transmits said audio frames to the plurality of speaker units. As such, the audio receiver includes an audio interface and a wireless access point. The audio receiver may be implemented as a small housing containing the necessary components within or be integrated into existing electronics such as a computer. The external host is an audio source of any kind; type of external hosts includes, but is not limited to, computers, smartphones, microphones, televisions, tablets, and media players. The audio interface is the means by which the audio receiver connects to the audio source. In one embodiment of the present invention, the audio interface is a physical component which connects to the external host through a physical bus such as a universal serial bus (USB) and high-definition multimedia interface (HDMI). In another embodiment of the present invention, the audio interface is a device which utilizes a wireless local area network (WLAN) to connect the audio receiver to the external host. The wireless access point is a device which allows multiple wireless devices to connect together without the use of cables and wires. It is preferred that the wireless access point utilizes IEEE 802.11 network standards, although other methods and means may be used in alternative embodiments of the present invention.

Figure 2:
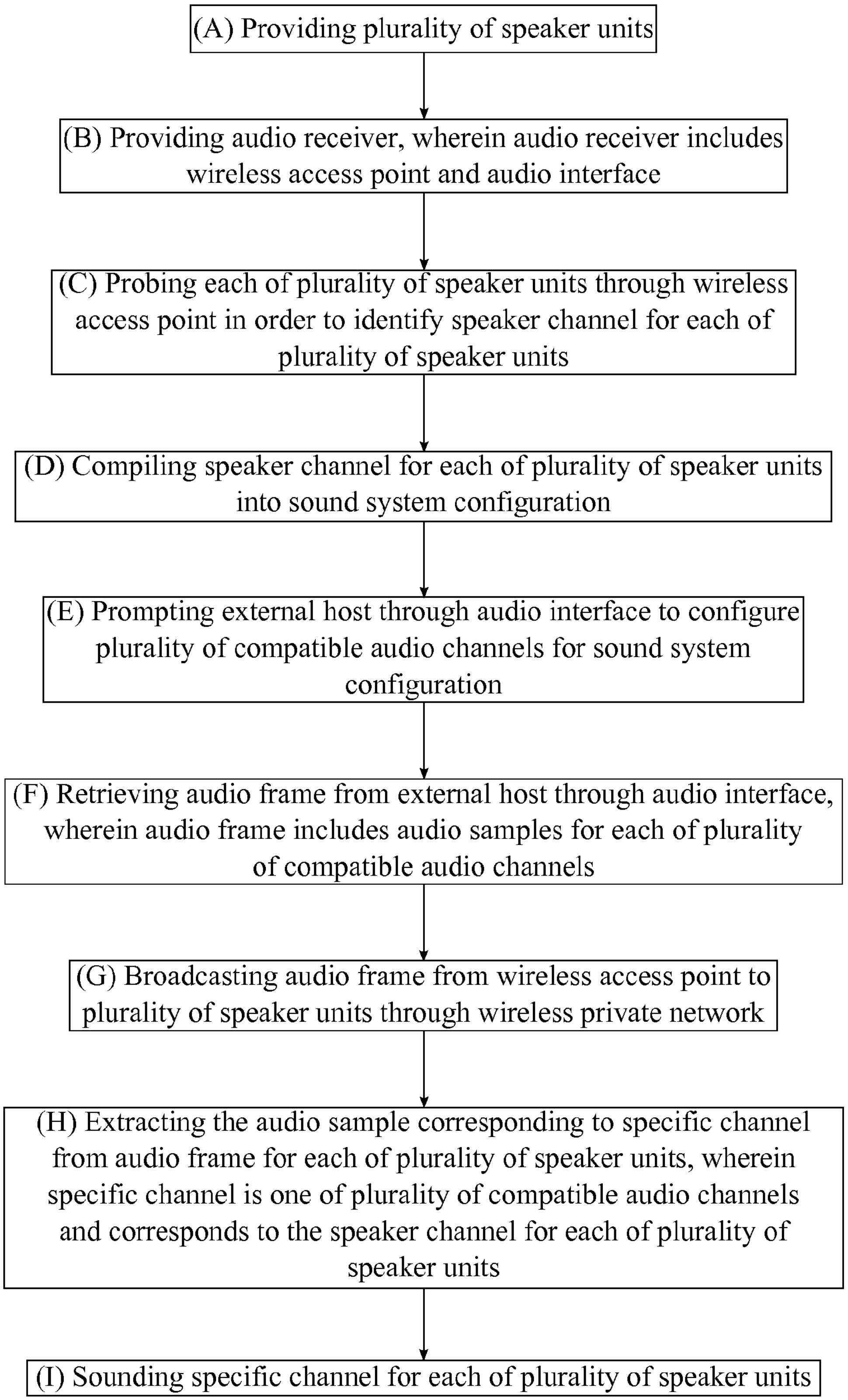
FIG. 2 is a flow diagram depicting the overall process of the present invention.

Referring to FIG. 2, the overall process of the present invention delineates the primary steps required to be taken in order to transmit audio data from the external host to the plurality of speaker units through a private wireless network. Once provided with the necessary hardware components, the overall process begins with the probing of each of the plurality of speaker units through the wireless access point in order to identify a speaker channel for each of the plurality of speaker units. The position of the speaker unit relative to the user is used to determine the audio channel for the speaker unit. For examples, the front left (channel 1) speaker is placed at the front on the left side; the front right (channel 2) speaker is placed at the front on the right side; the front center (channel 3) speaker is placed at the front in the center. Next, the speaker channel for each of the plurality of speaker units is compiled into a sound system configuration. The sound system configuration conveys to the external host the type of speaker units utilized, the location to the speaker units relative to the user, and other similar descriptive attributes. One popular sound system configuration, also known as a 5.1 surround sound system, utilizes a front left speaker unit, a front right speaker unit, a front center speaker unit, a back left speaker unit, a back right speaker unit, and a subwoofer (low frequency effects) speaker unit to encircle the user with sound.

The sound system configuration is then conveyed to the external host through the audio interface in order for the external host to configure a plurality of compatible audio channels specifically for said sound system configuration. This may include the addition, deletion, and alteration of audio channels and the corresponding audio samples. Next, an audio frame is retrieved from the external host through the audio interface. The audio frame includes audio samples for each of the plurality of compatible audio channels. The audio frame is then broadcasted from the wireless access point to the plurality of speaker units through a wireless private network for playback. Broadcasting the audio frame is the main way the present invention ensures that there is no delay in sound playback since only one signal/stream is required to transmit the audio frame to the plurality of speaker units. Additionally, since the audio frame is broadcasted through a wireless private network, the whole network is fully open and devoted purely for the present invention; this is another means for preventing delay in sound playback. Current commercial wireless speaker systems only has one wireless speaker unit, which handles all of the channel audio samples of the audio frame. Said systems do not have a plurality of wireless speaker units.

Continuing the overall process, each of the plurality of speaker units extracts the audio samples corresponding to a specific channel from the audio frame, wherein the specific channel is associated with one of the plurality of speaker units. For example, the speaker unit handles channel 1 (the front left channel) will extract the audio sample corresponding to channel 1 from the audio frame. Finally, the audio sample is sounded for each of the plurality of speaker units, this step includes converting the extracted audio sample into an analog signal by a DAC module. Through the use of the private wireless network, the present invention guarantees the audio receiver can send the audio frames to a plurality of speaker units with no interruption by other outside wireless devices. This synchronizes the sound produced by the plurality of speaker units. From the user perspective, a synchronized sound system is perceived as higher quality audio.

Figure 6:
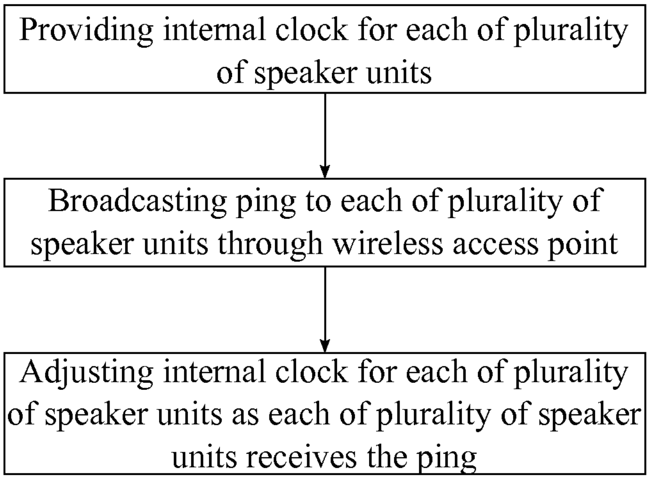
FIG. 6 is a flow diagram depicting the steps executed for the synchronization process.

To ensure there are no out of sync in sound playback for a plurality of the wireless speaker units, the present invention utilizes a synchronization process, the overall steps are depicted in FIG. 6. The synchronization process is executed periodically during sound playback in order to sync the plurality of speaker units together. The process includes broadcasting a ping to all of the plurality of speaker units through the wireless access point. Upon receiving the ping, each of the plurality of speaker units adjusts their respective internal clock to match the period of the ping. Because the ping is broadcasted to the plurality of speaker units simultaneously, each speaker unit will adjust its internal clock at the same time and in turn sync with all of the other speaker unit.

Figure 3:
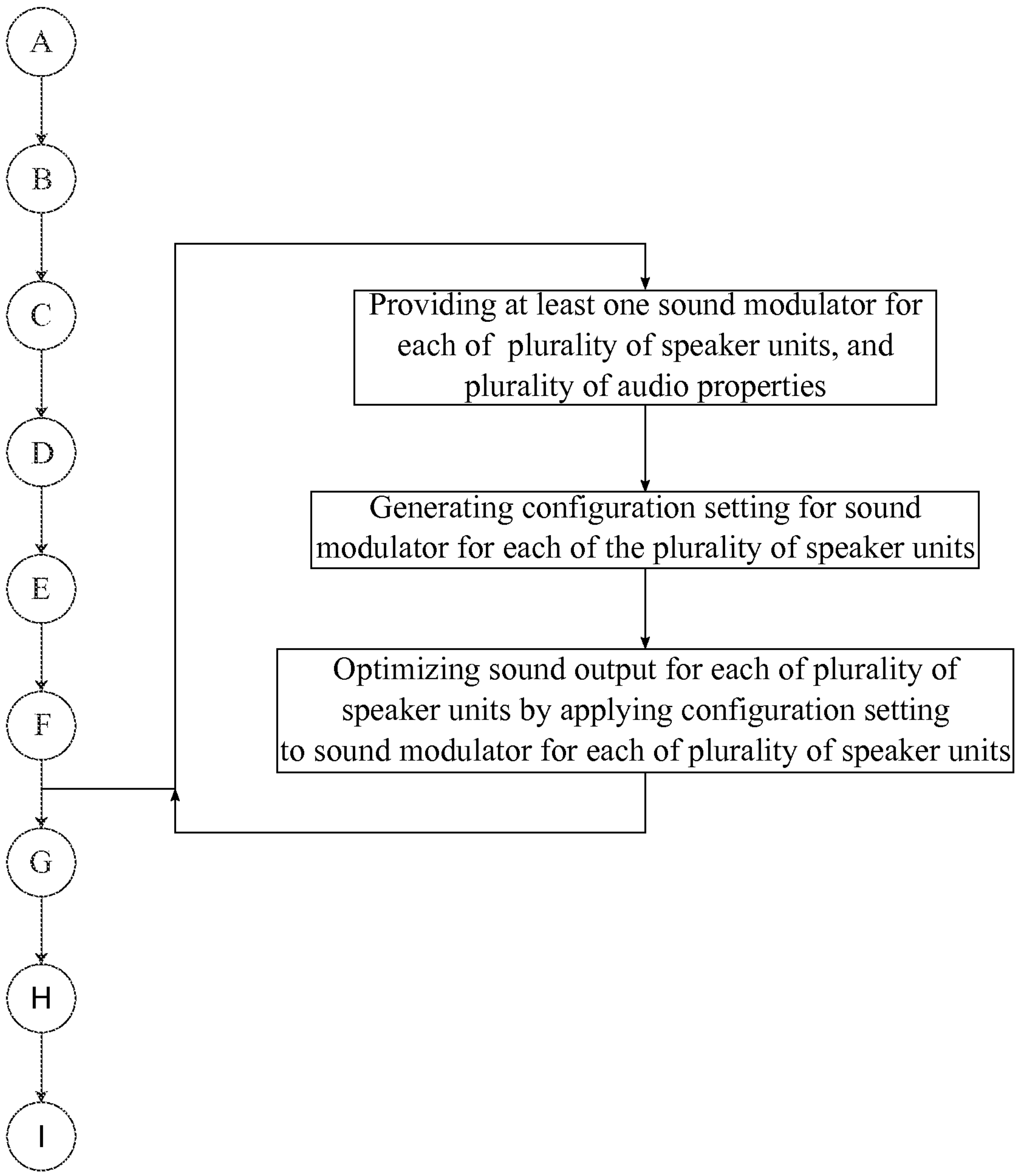
FIG. 3 is a flow diagram depicting the steps executed for generating and applying configuration settings to the sound modulator for each of the plurality of speaker units.

Referring to FIG. 3, the present invention also ensures that each of the plurality of speaker units is properly configured to be compatible with the format of the audio frames provided by the external host. This process is executed once before the audio source streams the audio. For each different format/type of audio frame, a configuration setting is generated for the sound modulator for each of the plurality of speaker units. Configurations settings includes, but is not limited to, sample rate, sample resolution, volume setting, and other relevant characteristics. The configurations settings are applied to the sound modulator of each of the plurality of speaker units to optimize the sound output. This ensures that the audio samples are properly processed by each of the plurality of speaker units. One example is setting the DAC sample rate to the sample rate of the audio source.

Figure 5:
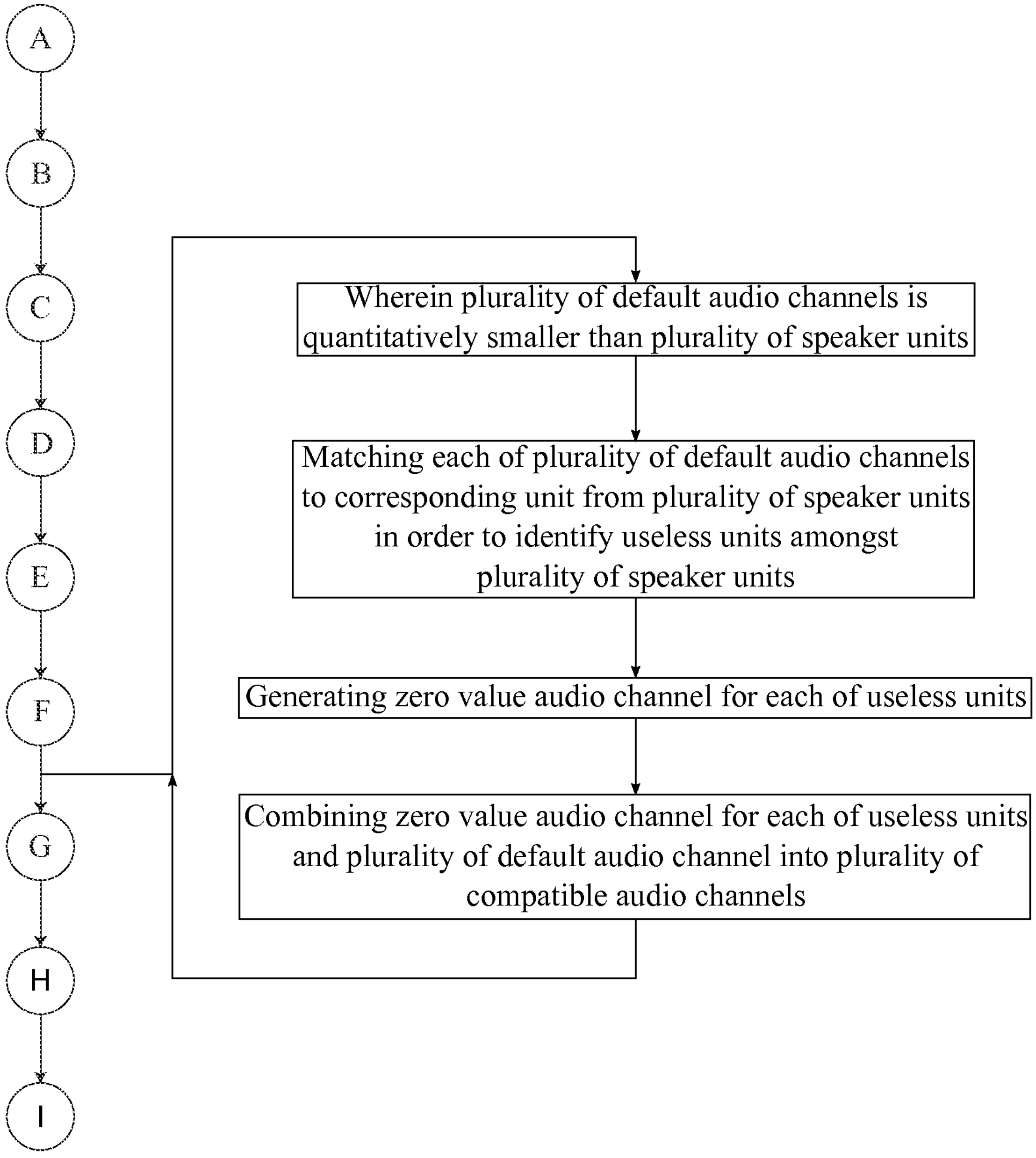
FIG. 5 is a flow diagram depicting the steps executed for when the plurality of default audio channels is quantitatively smaller than the plurality of speaker units.

In situations where the sound system configuration does not match the number of channels used by the audio frames, the external host modifies the audio frame accordingly. Referring to FIG. 5, one situation includes a plurality of default audio channels being quantitatively smaller than the plurality of speaker units, wherein the plurality of default audio channels refers to the audio channels of the audio frame. In general, there are not enough default audio channels to support the plurality of speaker units. In this situation the external host will match each of the plurality of default audio channels to a corresponding unit from the plurality of speaker units in order to identify useless units amongst the plurality of speaker units. Then the external host will generate a zero value audio channel, an audio sample with zero value (mute), for each of the useless units and combine said zero value samples and the audio samples of the plurality of default audio channels into the audio frame. The audio frame is then broadcasted to the plurality of speaker units as described in the overall process for the present invention. The zero value audio samples converted by the associated speaker unit and comes out of the speakers as mute.

Figure 4:
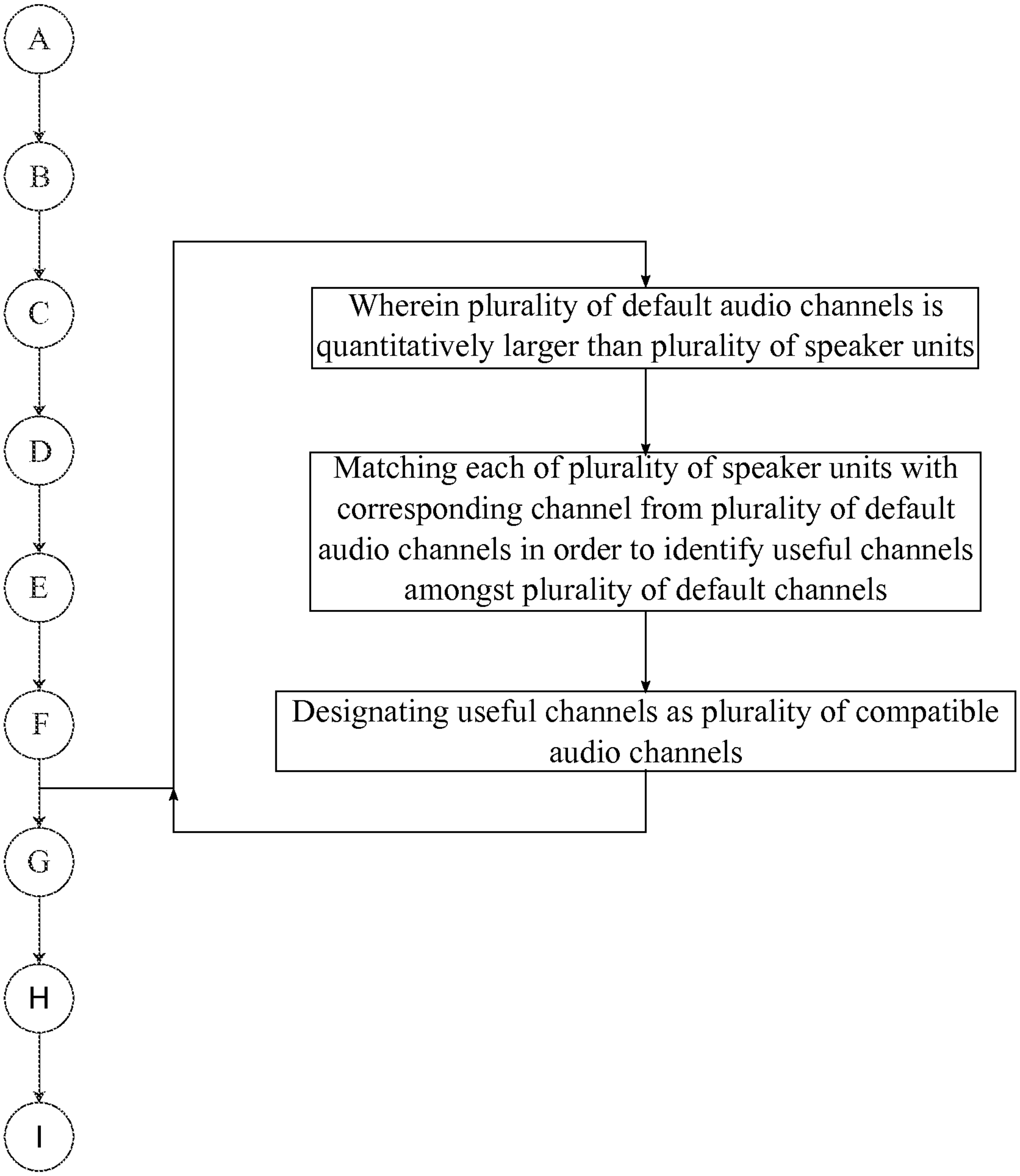
FIG. 4 is a flow diagram depicting the steps executed for when the plurality of default audio channels is quantitatively larger than the plurality of speaker units.

Referring to FIG. 4, another situation is when the plurality of default audio channels is quantitatively larger than the plurality of speaker units. In this case, the external host will match each of the plurality of speaker units with a corresponding channel from the plurality of default audio channels in order to identify useful channels amongst the plurality of default channels. Then the external host will designate the useful channels as the plurality of compatible audio channels, excluding the useless channels in the process. In one embodiment, the plurality of default audio channels may be combined together as well.

Although the invention has been explained in relation to its preferred embodiment, it is to be understood that many other possible modifications and variations can be made without departing from the spirit and scope of the invention as hereinafter claimed.

What is claimed is:

1. A method for a multi-channel wireless speaker system by executing computer-executable instructions stored on a non-transitory computer-readable medium, the method comprises the steps of:

providing a plurality of speaker units;

providing an audio receiver, wherein the audio receiver includes a wireless access point and an audio interface;

probing each of the plurality of speaker units through the wireless access point in order to identify a speaker channel for each of the plurality of speaker units;

compiling the speaker channel for each of the plurality of speaker units into a sound system configuration;

prompting an external host through the audio interface to configure a plurality of compatible audio channels for the sound system configuration;

retrieving an audio frame from the external host through the audio interface, wherein the audio frame includes audio samples for each of the plurality of compatible audio channels;

broadcasting the audio frame from the wireless access point to the plurality of speaker units through a wireless private network;

extracting the audio sample corresponding to a specific channel from the audio frame for each of the plurality of speaker units, wherein the specific channel is one of the plurality of compatible audio channels and corresponds to the speaker channel for each of the plurality of speaker units; and sounding the audio sample for each of the plurality of speaker units.

2. The method for a multi-channel wireless speaker system by executing computer-executable instructions stored on a non-transitory computer-readable medium, the method claimed in claim 1 comprises the steps of:

providing an internal clock for each of the plurality of speaker units;

broadcasting a ping to each of the plurality of speaker units through the wireless access point; and adjusting the internal clock for each of the plurality of speaker units as each of the plurality of speaker units receives the ping.

3. The method for a multi-channel wireless speaker system by executing computer-executable instructions stored on a non-transitory computer-readable medium, the method claimed in claim 1, wherein the wireless access point broadcasts the audio frame to each of the plurality of speakers through a user datagram protocol (UDP).

4. The method for a multi-channel wireless speaker system by executing computer-executable instructions stored on a non-transitory computer-readable medium, the method claimed in claim 1 comprises the steps of:

providing at least one sound modulator for each of the plurality of speaker units, and a plurality of audio properties;

generating a configuration setting for the sound modulator for each of the plurality of speaker units; and optimizing a sound output for each of the plurality of speaker units by applying the configuration setting to the sound modulator for each of the plurality of speaker units.

5. The method for a multi-channel wireless speaker system by executing computer-executable instructions stored on a non-transitory computer-readable medium, the method claimed in claim 1, wherein the sound modulator is a digital-to-analog converter module.

6. The method for a multi-channel wireless speaker system by executing computer-executable instructions stored on a non-transitory computer-readable medium, the method claimed in claim 1 comprises the steps of:

wherein a plurality of default audio channels is quantitatively larger than the plurality of speaker units;

matching each of the plurality of speaker units with a corresponding channel from the plurality of default audio channels in order to identify useful channels amongst the plurality of default channels; and designating the useful channels as the plurality of compatible audio channels.

7. The method for a multi-channel wireless speaker system by executing computer-executable instructions stored on a non-transitory computer-readable medium, the method claimed in claim 1 comprises the steps of:

wherein a plurality of default audio channels is quantitatively smaller than the plurality of speaker units;

matching each of the plurality of default audio channels to a corresponding unit from the plurality of speaker units in order to identify useless units amongst the plurality of speaker units;

generating a zero value audio sample for the channel for each of the useless units; and combining the zero value audio sample for the channel for each of the useless units and the audio samples of the plurality of default audio channel into an audio frame for the plurality of compatible audio channels.

* * * * *